M. Pierce.
Wash-Board.

Nº 64,445.    Patented May 7, 1867.

Witnesses
C. G. Maybury
C. D. Smith

Inventor
Marvin Pierce

United States Patent Office

MARVIN PIERCE, OF BUFFALO, WISCONSIN.

Letters Patent No. 64,445, dated May 7, 1867.

---

IMPROVED WASHING MACHINE.

---

The Schedule referred to in these Letters Patent and making part of the same.

---

Be it known that I, MARVIN PIERCE, of the town of Buffalo, in the county of Buffalo, and State of Wisconsin, have invented a new and useful Machine for Washing Clothes; and I do hereby declare that the following is a full, clear, and exact description of the construction and operation of the same, reference being had to the annexed drawings, making a part of this specification, in which—

Figure 1:
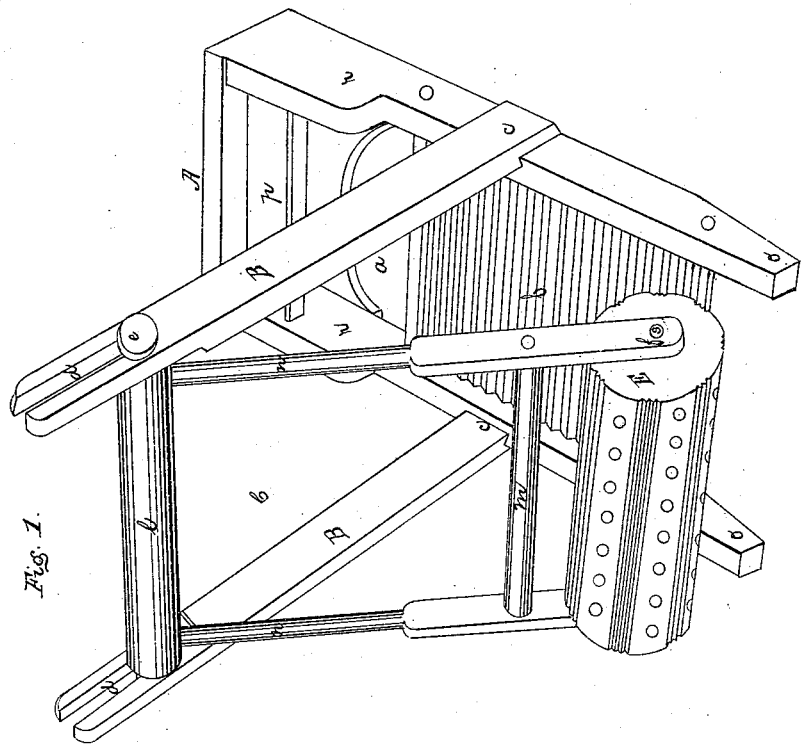

Figure 1 is a perspective view; and

Figure 2:
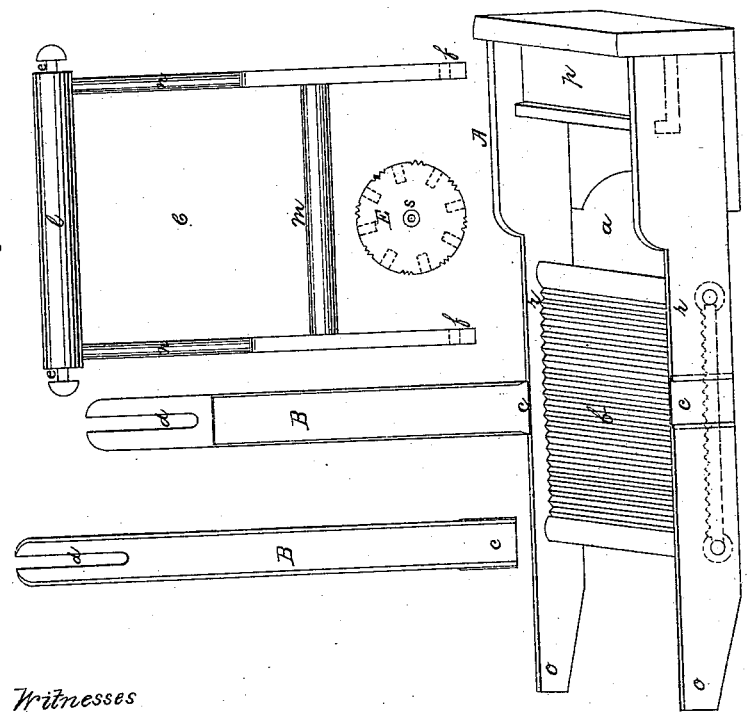

Figure 2, a detached sectional view, of which—

The section A is a grooved wash-board, of the make and form of those commonly used in rubbing or washing clothes by hand, excepting that it is constructed with an opening, $a$, immediately above the rubber or grooves $b$, sufficiently large to conveniently pass the articles washed through the same, with grooves in the rubber $b$ about one-fourth of an inch wide, with side-pieces $r$ one inch wider above the rubber $b$ than they are below this point, and with a shelf, $p$, in the upper end, a place for soap.

The section B are two uprights, about twenty-four inches in length, three inches in width, and one in thickness, fastened one on each side-piece $r$ of the wash-board A, opposite each other, by means of a dove-tail tenon and mortise, $c$, with each an open mortise, $d$, at their tops, about six inches in length and three-fourths of an inch in width.

The section C is a sweep, about eighteen inches in length, and of a width equal to the distance between the said uprights, the gudgeons $b$ of the roller $l$ of which play in the mortises $d$.

The section E is a cylindrical rotary rubber, about eleven inches in length and about five inches in diameter, with its surface perforated and longitudinally grooved alternately, the perforations being about three-fourths of an inch in diameter, and the space grooved about one inch in width, and plays upon its gudgeons $s$ in the boxes $f$ at the lower end of the sides $n$ of the sweep C, and about one inch below the handle $m$ of the same.

When used, this machine is placed in a common wash-tub, resting its feet $o$ upon the bottom and its top upon the side of the same, with water in the tub in quantity sufficient to immerse the rotary rubber E therein at least one-half its diameter when hanging in the sweep at rest. The person working this machine stands at the top of the wash-board A, and by taking hold of the handle $m$ of the sweep C the rotary rubber E is rolled back and forth upon and over the article to be washed, which is placed upon the plain rubber $b$ of the wash-board A until it is sufficiently rubbed or washed, and then for the sake of convenience the part thus rubbed or washed is passed through the opening $a$, and another portion of it is washed or rubbed in the same manner, and so on, the aforesaid perforations of the cylinder-formed rotary rubber E doing the office of so many buckets to carry up and keep an ample and sufficient flow of water over the article being washed, while they also, and the grooves, facilitate the cleansing of the same.

What I claim as my invention, and desire to secure by Letters Patent, is—

The combination of the rotary cylindrical rubber E, sweep C, slotted uprights B B, and wash-board A, the latter having the opening $a$ and soap-shelf $p$, and all being constructed and arranged as herein described and represented.

MARVIN PIERCE.

Witnesses:
C. W. GILBERT,
LEONARD HAUSER.